United States Patent [19]

McElroy et al.

[11] 4,409,035
[45] Oct. 11, 1983

[54] CLAMP FOR VARYING THE HINGING ACTION OF A FLUID STRIPPING BAG

[76] Inventors: Lucian G. McElroy, 3315 Brocker Rd., Metamora, Mich. 48455; David R. Day, 4334 Ocean Dr., Apt. 203, Corpus Christi, Tex. 78012

[21] Appl. No.: 338,577

[22] Filed: Jan. 8, 1982

[51] Int. Cl.³ .......................... B08B 1/00; B08B 13/00
[52] U.S. Cl. ........................................ 134/6; 15/97 B; 15/312 A; 15/DIG. 2; 134/37; 285/199; 403/234; 403/235
[58] Field of Search .......................... 134/6, 18, 32, 37; 15/DIG. 2, 97 B, 312 R, 312 A, 316 R, 405, 307; 285/199, 238; 403/191, 209, 234, 235; 34/241

[56] References Cited

U.S. PATENT DOCUMENTS

| | | | |
|---|---|---|---|
| 3,003,177 | 10/1961 | Hijiya | 15/405 X |
| 3,263,341 | 8/1966 | Allen | 15/DIG. 2 X |
| 3,600,224 | 8/1971 | Stilwell | 15/312 A X |
| 3,967,839 | 7/1976 | Dunmire | 285/199 |
| 4,161,801 | 7/1979 | Day et al. | 15/316 R |

*Primary Examiner*—Richard V. Fisher
*Attorney, Agent, or Firm*—Harold W. Milton, Jr.

[57] ABSTRACT

An adjustable clamp (26) for selectively varying the hinging action of a flexible, inflatable fluid-stripping bag (12) including an elongated bag inlet (14) having a predetermined cross-sectional area and a nozzle (16) at one end thereof and wherein the bag inlet (14) is mounted about an opening (24) of a plenum (20) for supplying air to the bag (12). The clamp comprises an adjustable frame (26) adapted to be disposed about the bag inlet (14) and spaced therefrom to adjustably limit the extent to which the bag inlet (14) opens to determine the cross-sectional area and a band member and fastening device for securing the frame (26) about the bag inlet (14) whereby a change in the cross-sectional area produced by the frame (26) changes the resistance of the hinging action of the bag (12).

A method is also provided for selectively varying the hinging action of the flexible, inflatable fluid-stripping bag (12) including the steps of mounting the bag inlet (14) about an opening (24) of a plenum (20) for supplying air to the bag (12) and characterized by selectively varying the cross-sectional area of the bag inlet (14) to vary the hinging action of the bag (12) whereby changing the cross-sectional area of the bag inlet (14) changes the resistance to hinging action of the bag (12).

19 Claims, 5 Drawing Figures

CLAMP FOR VARYING THE HINGING ACTION OF A FLUID STRIPPING BAG

TECHNICAL FIELD

This invention relates to an apparatus for stripping fluids from the surface of an object. The invention is particularly suitable as being part of a carwash system for stripping rinse water from a vehicle.

BACKGROUND ART

A new generation of carwash systems for effectively stripping rinse water from a vehicle passing therethrough is disclosed by U.S. Pat. No. 4,161,801 to Day et al. The apparatus includes a plenum supplying air under pressure and in communication with the open end of a flexible bag. Air is supplied through the bag to the nozzle of the bag which is in contact with the surface of the car to be stripped of water. The bag flexes at a hinge point to allow a vehicle to pass through the system. A problem arises either when the bag is so flexible that the nozzle does not contact the vehicle with sufficient force to effectively strip the water from the vehicle or when the bag is so rigid that it does not sufficiently flex at the hinge point to allow the vehicle to pass through the system. In the prior art systems, the bags are connected directly to the plenums and no means are provided for varying the resistance to hinging of the bags.

STATEMENT OF INVENTION AND ADVANTAGES

The instant invention provides an adjustable clamp apparatus for selectively varying the hinging action of a flexible, inflatable fluid-stripping bag including an elongated bag inlet having a predetermined cross-sectional area and a nozzle at one end thereof, wherein the bag inlet is mounted about an opening of a plenum for supplying air to the bag. The apparatus is characterized by comprising an adjustable clamp means for selectively varying the cross-sectional area of the bag inlet to vary the hinging action of the bag whereby a change in the cross-sectional area produced by the clamp means changes the resistance to hinging action of the bag.

A method of selectively varying the hinging action of a flexible inflatable fluid-stripping bag is also provided and includes the steps of mounting the bag inlet about the opening of the plenum for supplying air to the bag and selectively varying the cross-sectional area of the bag inlet to vary the hinging action of the bag whereby changinng the cross-sectional area of the bag inlet changes the resistance to hinging action of the bag.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
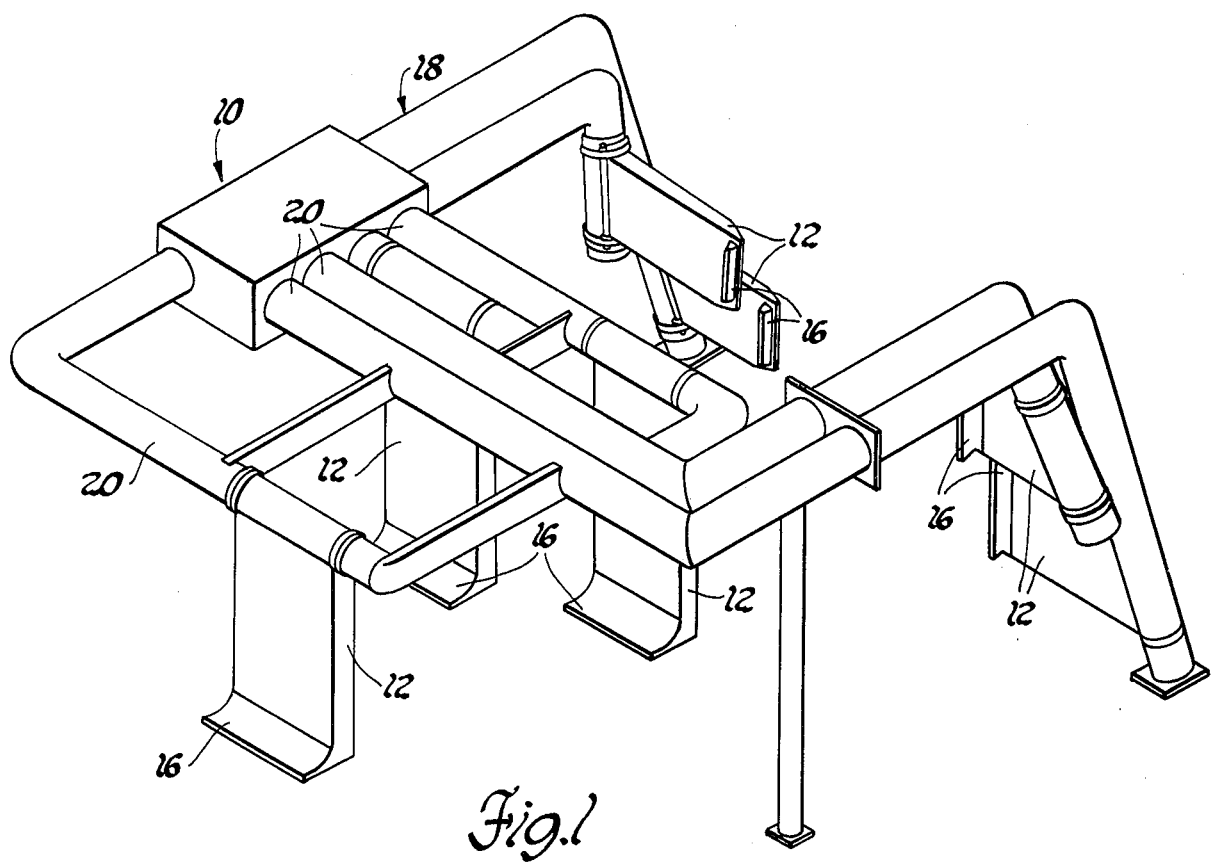
FIG. 1 is a perspective view of a drying station in a carwash system constructed in accordance with the instant invention.
Figure 2:
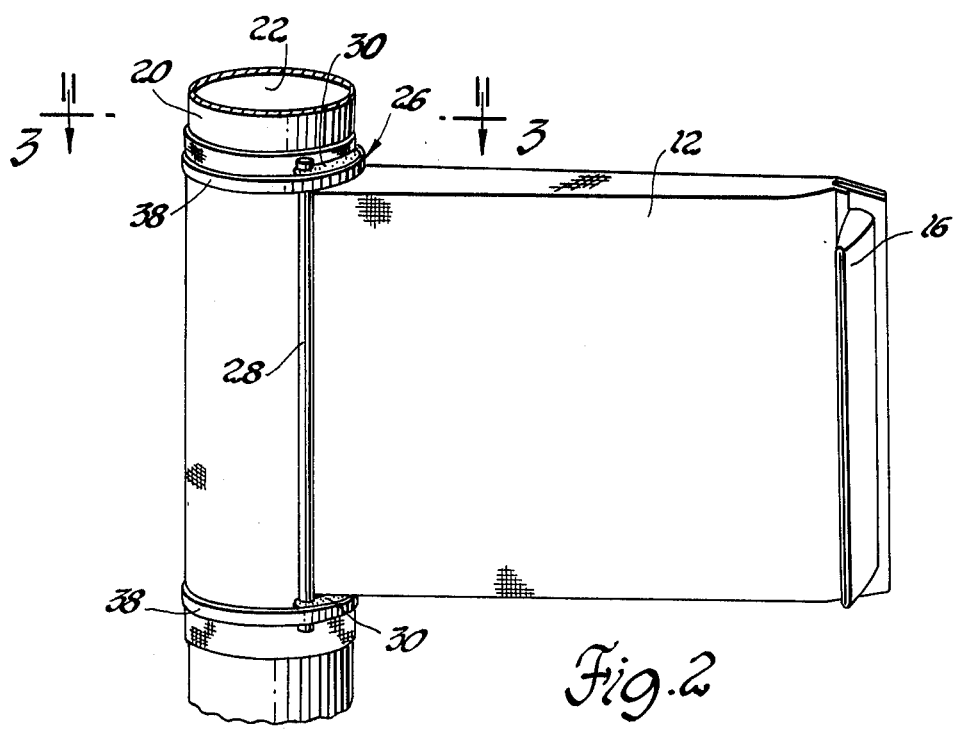
FIG. 2 is a perspective view of a flexible bag connected to a plenum by a clamping apparatus constructed in accordance with the instant invention.
Figure 3:
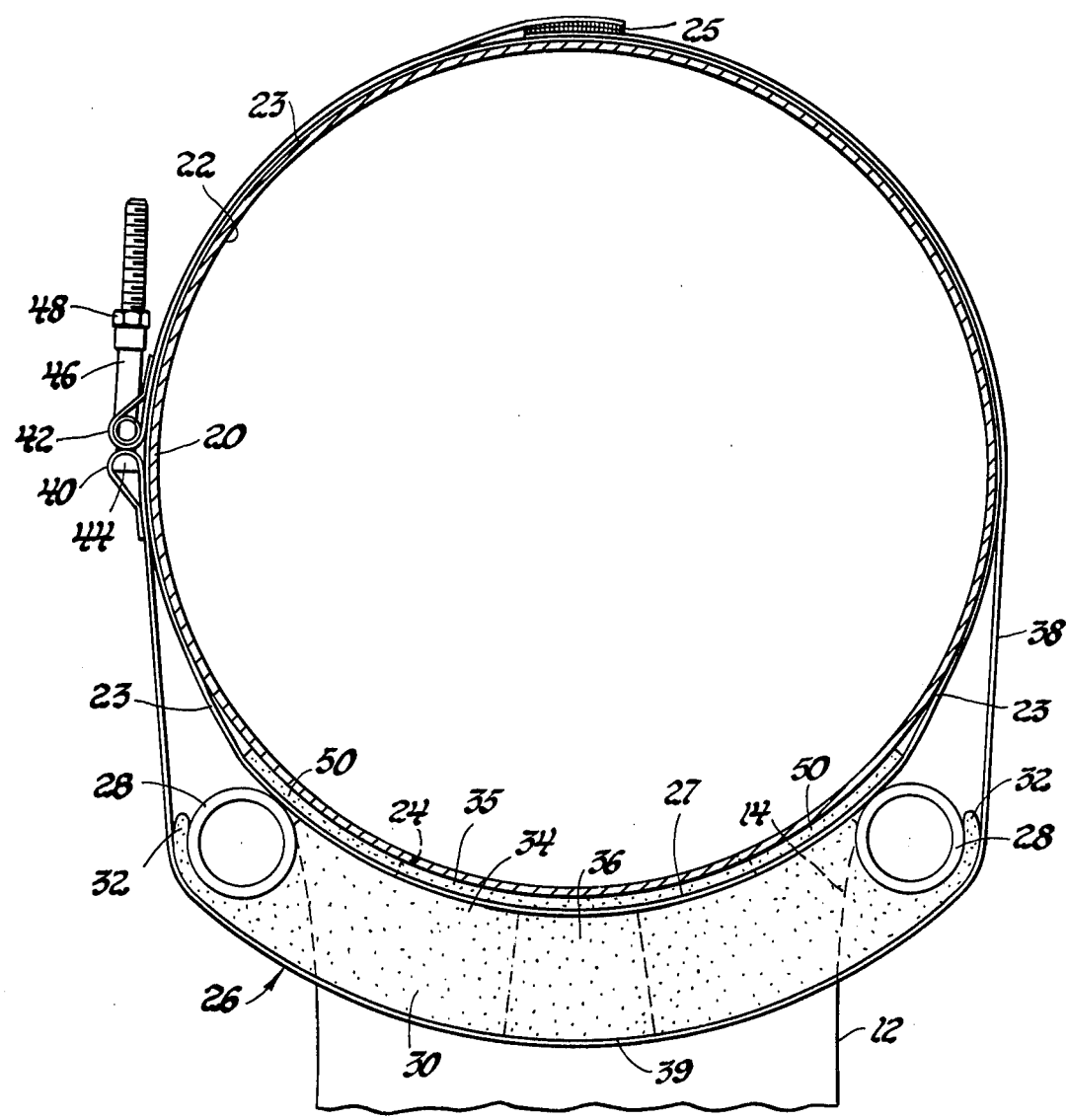
FIG. 3 is an enlarged cross-sectional view of the instant invention taken substantially along lines 3—3 of FIG. 2 wherein hatched lines designate the central portion of the saddle member.
Figure 4:
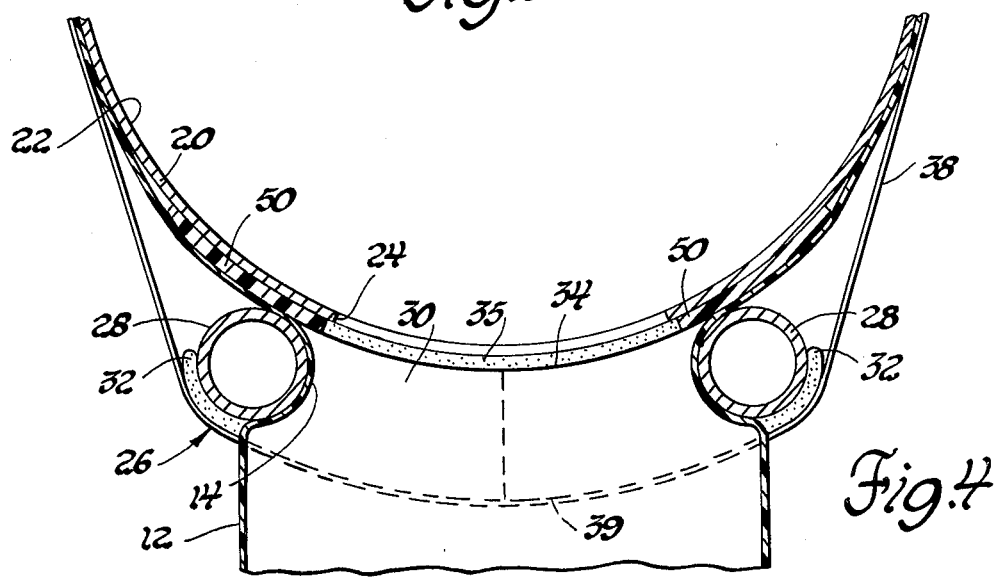
FIG. 4 is an enlarged cross-sectional view through the transverse center of the instant invention wherein the central portion of the saddle member has been removed to decrease the distance between the rod members of the instant invention.

A drying station of a carwash system for stripping fluids from the surface of a vehicle is generally shown at 10 in FIG. 1. The carwash system 10 includes a plurality of flexible inflatable bags 12 which are essentially similar in that they are made from a flexible sheet of material, such as thin plastic or cloth. The pieces of material are sewn together to form a desired shape. The bag 12 includes an elongated bag inlet 14, as shown in FIGS. 3 and 4. The bag inlet 14 has a predetermined cross-sectional area. An elongated opening is at one end of the bag 12 defining a nozzle 16. The nozzle 16 is adapted to emit a stream of air when the bag 12 is inflated.

The bags 12 are supported by an air distributor system, generally indicated at 18. The system 18 includes a plurality of overhead ducts or plenum 20 which may be supported by the sealing super structure of the building which houses the carwash system 10. Each plenum 20 has a chamber 22 therein and an opening 24 therethrough. The bag inlet 14 releasably mounted about the opening 24 for the communication of air therebetween. Each bag (12) includes a first pair of bag flanges 23 extending along the length of the bag inlet 14. The flanges 23 extend about or wrap around the plenum 20, and the ends thereof are secured together by a suitable fastening means 25, such as Velcro. Thusly, a bag 12 can easily be removed for repair, adjustment or replacement by releasing the Velcro connection. The bags 12 also include a second pair of bag end flanges 27 extending from each width or end of the bag inlet 14.

The instant invention is characterized by adjustable clamp means, generally shown at 26, for selectively varying the cross-sectional area of the bag inlet 14 to vary the hinging action of the bag 12 whereby a change in the cross-sectional area of the bag inlet 14 produced by the clamp means 26 changes resistance to hinging action of the bag 12. In other words, as a car passes through the system 10, the bags 12 allow the car to pass therethrough by flexing at a hinge point about the connection between the bag 12 and plenum 20. The pressure applied by the nozzle against the car may be varied by varying the absolute value of the cross-sectional area of the bag inlet 14 at the hinge point of the bag 12. It is not a matter of varying the area of the opening 24 of the plenum 20 but rather of increasing or decreasing the cross-sectional area of the bag 12 at the hinge point where it is connected to the plenum 20. The larger the cross-sectional area at the point of connection of the bag 12 to the plenum 20, the greater the resistance to hinging action and, hence, the greater pressure applied by the nozzle 16 at the end of the bag 12 against the surface of a passing car to be stripped of water. Conversely, the smaller the cross-sectional area is at the hinge point, the less the bag 12 is resistant to flexure with respect to the plenum 20 and the less pressure there is of the nozzle 16 to the surface of the car to be stripped of water.

The clamp means 26 is defined by an adjustable frame assembly disposed about the bag inlet 14 for adjustably limiting the extent to which the bag inlet 14 opens to the opening 24 to determine the cross-sectional area thereof. The frame 26 includes a pair of rod members 28, each of the rod members extending the length of the opening 24 on each side thereof. Seating means selectively varies the distance between the rod members 28, the rod members 28 being seated within the seating means. The seating means comprises a pair of saddle members 30 having adjustable lengths, each of the saddle members 30 extending beyond the width of the opening 24 and including an arcuate lip portion 32 extending from each end thereof defining an arcuate seating surface for supporting a portion of the respective one of the rod members 28. In other words, the end portion of each rod member 28 sits within a seating surface of a respective saddle member 30 and the lip portions 32 urge the rod members 28 against the plenum 20. Each saddle member 30 has an inner arcuate surface 34 which clamps each of the bag end or second flanges 27 against a sealing strip 35, the sealing strip 35 being glued or otherwise adhered to the peripheral surface of the opening 24 of the plenum 20 and extending the width thereof. As shown in FIG. 3, each saddle member 30 includes a central portion 36 (designated by hatched lines) between the ends thereof. The central portion 36 may be selectively removed to selectively adjust the distances between the seating surface thereof, thereby adjusting the distances between the rod members 28. Thusly, the rod members 28 and saddle members 30 coact to provide an adjustable frame about the opening 24 of the plenum 20 and inlet 14 of the bag 12.

Securing means are provided for securing the frame 26 about the bag inlet 14. The securing means comprises a band member 38 encompassing each of the saddle members 30 and the tubular plenum 20. The securing means also includes fastening means for releasably fastening the ends of the band member 38 together so that the band 38 extends about each saddle member 30 and the plenum 20. In the preferred construction of the instant invention, the band member 38 includes cuffed end portions 40 and 42. The head of a bolt 44 is secured within the end portion 40 and a guiding sleeve 46 is secured within the end portion 42. A nut member 48 releasably secures the bolt 44 within the sleeve 46. The saddle members 30 have an outer arcuate surface 39 and the band member 38 is secured so as to tightly engage the outer surface 39 of the saddle member 30.

As shown in FIG. 3, the saddle members 30 are made from a single piece of rubber material including the central portion 36, which may be selectively removed. The central portion 36 may be removed by cutting a portion from the saddle member 30 to selectively produce a saddle member 30 having the desired length. Other constructions of the saddle member 30 may be used wherein the length of the saddle member may be adjusted by other methods.

Sealing means are disposed between the frame 26 and outer periphery of the opening 24 for perfecting a seal therebetween. The sealing means includes a pair of rubber strips 50 extending the length of the opening 24 on each side thereof and the sealing strips 35 extending the width or across the end of the opening 24. The strips 50 provide a seal between the rod members 28 and the first pair of bag flanges 23 and strips 35 provide a seal between the saddle members 30 and the second pair of bag end flanges 27. As the band 38 engages each saddle member 30, a seal is thusly perfected between the frame and the plenum 20 about the bag inlet 14.

Figure 5:
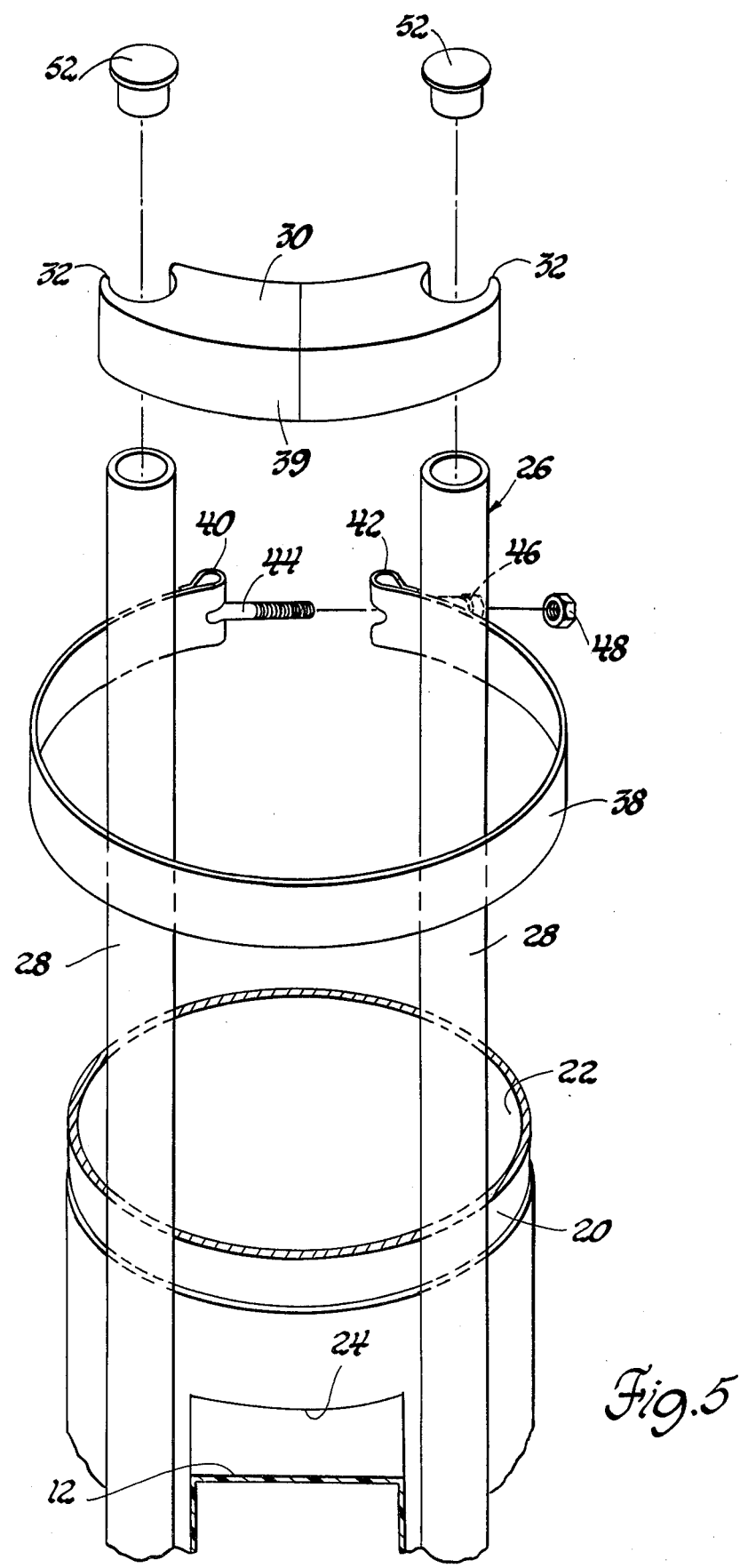
FIG. 5 is an exploded perspective view of a clamping apparatus constructed in accordance with the instant invention.

In operation, the bags 12 are first connected to the plenums 20 about the openings 24 by connecting the Velcro portions 25 together. The rod members 28 and saddle members 30 are assembled together to provide a frame about the inlet 14 of the bags 12 and are mounted on the plenum 20 so as to sandwich a peripheral portion of the bag inlet 14 between the rod members 28 and saddles 30 and the sealing strips 35 and 50 respectively. As shown in FIG. 5, cap members 52 may be inserted into the ends of the rod members 28. The frame 26 is then secured in place by fastening the band 38 about the frame 26 and plenum 22. The outer surface 39 of the saddle members 30 are contoured so that a band member 38 wraps about the outer surface of each saddle member 30 and the plenum 20 thereby securing each saddle member 30 to the plenum 20. The bolt member 44 is secured within the sleeve 46 by the nut member 48 thereby fastening the band member 38 in place. As shown in FIG. 3, the rods 28 may be disposed at a full width distance apart and the band member 38 secured in place to provide maximum resistance against flexure of the bag 12 and, therefore, maximum pressure against the surface of the vehicle to be stripped of the water. Conversely, as shown in FIG. 4, the central portion 36 of the saddle member 30 may be removed so that the rod members 28 are disposed at a reduced width from each other to decrease the resistance to flexure of the bag 12 at its hinge point adjacent the opening 24, thereby decreasing the pressure applied by the nozzle 16 on the vehicle surface.

The instant invention further provides a method of selectively varying the hinging action of the flexible, inflatable fluid-stripping bag 12. The method comprises the steps of mounting the bag inlet 14 about the opening 24 of the plenum 20 for supplying air to the bag 12 and characterized by selectively varying the cross-sectional area of the bag inlet 14 to vary the hinging action of the bag 12 whereby changing the cross-sectional area of the bag inlet 14 changes the resistance of the hinging action of the bag 12.

More specifically, the adjustable frame 26 is disposed about the periphery of the bag inlet 14 and the size of the frame 26 is adjusted to adjustably limit the extent to which the bag inlet 14 opens thereby determining the cross-sectional area of the bag 12. The frame 26 is secured about the bag inlet 14 and a seal is perfected between the frame 26 and the outer periphery of the opening 24. A pair of rod members 28 are disposed along the length of the opening 24 on each side thereof and the ends of the rod members 28 are seated within respective seating surfaces of a pair of saddle members 30. The saddle members 30 extend along the width of the opening 24 on each side of the bag inlet 14. The width of the saddle members are selectively adjusted by removing a predetermined part of the central portion 36 thereof to adjust the distance between the rod members 28 thereby determining the cross-sectional area of the bag inlet 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An apparatus (10) for stripping fluid from the surface of an object, said apparatus (10) comprising: a flexible inflatable bag (12) including an elongated bag inlet (14) having a predetermined cross-sectional area and an elongated opening at one end of said bag (12) defining a nozzle (16); a plenum (20) having a chamber (22) therein and an opening (24) therethrough, said bag inlet (14) being releasably mounted about said opening (24) for the flow of air from said plenum (20) and into said bag (12); and characterized by adjustable clamp means (26) for selectively varying said cross-sectional area of said bag inlet (14) to vary the hinging action of said bag (12) whereby a change in said cross-sectional area produced by said clamp means (26) changes the resistance to hinging action of said bag (12).

2. An apparatus as set forth in claim 1 further characterized by said clamp means (26) including adjustable frame means (26) disposed about said bag inlet (14) for adjustably limiting the width of and, therefore, the extent to which said bag inlet (14) opens to said opening (24) to determine said cross-sectional area of said bag inlet and securing means for securing said frame means (26) about said bag inlet (14).

3. An apparatus as set forth in claim 2 further characterized by said frame means (26) comprising a pair of rod members (28), each of said rod members (28) extending the length of said opening (24) on each side thereof, said frame means (26) further including adjustable seating means (30) for selectively varying the distance between said rod members (28), said rod members (28) being seated within said seating means (30).

4. An apparatus as set forth in claim 3 further characterized by said seating means (30) including a pair of saddle members (30) having adjustable lengths, each of saddle members (30) extending beyond the width of said opening (24) and including an arcuate lip portion (32) extending from each end thereof defining an arcuate seating surface for supporting a portion of a respective one of said rod members (28).

5. An apparatus as set forth in claim 4, further characterized by said saddle members (30) including a central portion (36) between the ends thereof which may be selectively removed to selectively adjust the distances between said seating surfaces thereof.

6. An apparatus as set forth in claim 5, further characterized by said securing means including a band member (38) extending about each of said saddle members (30) and said plenum (20) and fastening means (44, 48) for releasably securing said band members (38) thereabout.

7. An assembly as set forth in claim 6, further characterized by said saddle members (30) being made from a single piece of rubber-like material including said central portion (36) which may be selectively removed.

8. An apparatus as set forth in claim 7, further characterized by including sealing means (35, 50) disposed between said frame means (26) and the outer periphery of said opening (24) for perfecting a seal therebetween.

9. An apparatus as set forth in claim 8, further characterized by said sealing means being a first pair of strips (50) extending the length of said opening (24) on each side thereof and a second pair of sealing strips (35) on each end thereof.

10. An apparatus as set forth in claim 9, said plenum (20) comprising a cylindrical tube member (20) defining said chamber (22) therein and including said opening (24) therethrough.

11. An apparatus as set forth in claim 10 further characterized by said bag (12) including a first pair of flanges (23) extending about said cylindrical tube member (20) and having second fastening means on the end portion of each first flange (23) for securing the ends of said first flanges (23) together, said first flanges (23) being clamped between said rod members (28) and said sealing means (50).

12. An apparatus as set forth in claim 11 further characterized by said second fastening means being Velcro.

13. An apparatus as set forth in claim 12 further characterized by said bag (12) including a second pair of flanges (27), said second pair of flanges (27) being clamped between said sealing means (35) and said saddle members (30).

14. An apparatus as set forth in claim 13 wherein said saddle members (30) include an inner arcuate surface (34) engaging said second flanges (27) and an outer arcuate surface (39), said band member (38) engaging said outer arcuate surface (39).

15. A method of selectively varying the hinging action of a flexible, inflatable fluid-stripping bag (12) including an elongated bag inlet (14) having a predetermined cross-sectional area and a nozzle (16) at one end thereof, said method comprising the steps of: mounting the bag inlet (14) about an opening (24) of a plenum (20) for supplying air to the bag (12) and selectively varying the cross-sectional area of the bag inlet (14) to vary the hinging action of the bag (12) whereby changing the cross-sectional area of the bag inlet (14) changes the resistance to hinging action of the bag (12).

16. A method as set forth in claim 15 further characterized by the steps of disposing an adjustable frame (26) about the periphery of the bag inlet (14) and adjusting the size of the frame (26) to adjustably limit the extent to which the bag inlet (14) opens to determine the cross-sectional area of the bag (12) and securing the frame (26) about the bag inlet (14) and perfecting a seal between the frame (26) and the outer periphery of the opening (24).

17. A method as set forth in claim 16 further characterized by disposing a pair of rod members (28) along the length of the opening (24) on each side thereof and selectively varying the distance between the rod members (28).

18. A method as set forth in claim 17 further characterized by seating the ends of the rod members (28) within respective seating surfaces of a pair of, saddle members (30), the saddle members (30) extending beyond the width of the opening (24) on each side of the bag inlet (14) and selectively adjusting the width of the saddle members (30) to adjust the distance between the rod members (28).

19. A method as set forth in claim 18 further characterized by selectively removing a central portion (36) of the saddle member (30) to adjust the distances between the rod members (28).

* * * * *